United States Patent
Kikuchi

(12) 
(10) Patent No.: US 9,025,184 B2
(45) Date of Patent: May 5, 2015

(54) INFORMATION PROCESSING APPARATUS, CONTROL METHOD THEREOF, AND COMPUTER-READABLE RECORDING MEDIUM FOR DISPLAYING LIVE TILE CONTENTS WHILE PERFORMING SWITCHING THEREOF

(71) Applicant: Canon Kabushiki Kaisha, Tokyo (JP)

(72) Inventor: Hiroshi Kikuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/891,741

(22) Filed: May 10, 2013

(65) Prior Publication Data
US 2013/0301071 A1     Nov. 14, 2013

(30) Foreign Application Priority Data
May 14, 2012    (JP) ................................. 2012-110750

(51) Int. Cl.
*G06K 15/00*    (2006.01)
*G06F 3/12*    (2006.01)

(52) U.S. Cl.
CPC ............ *G06F 3/1293* (2013.01); *G06F 3/1204* (2013.01); *G06F 3/1229* (2013.01); *G06F 3/1285* (2013.01)

(58) Field of Classification Search
USPC .......... 358/1.12–1.17, 1.1, 1.9, 1.5; 715/713, 715/734–737, 853–854; 719/321, 327; 710/9, 10, 15, 19
See application file for complete search history.

(56) References Cited

U.S. PATENT DOCUMENTS

| | | | |
|---|---|---|---|
| 6,618,163 B1* | 9/2003 | Roosen et al. | 358/1.15 |
| 2004/0080783 A1* | 4/2004 | Owen et al. | 358/1.15 |
| 2008/0304101 A1* | 12/2008 | Sasase | 358/1.15 |
| 2012/0190386 A1* | 7/2012 | Anderson | 455/456.3 |

FOREIGN PATENT DOCUMENTS

| | | |
|---|---|---|
| JP | 8-149239 A | 6/1996 |
| JP | 11-134140 A | 5/1999 |
| JP | 2000-284933 A | 10/2000 |
| JP | 2010-123103 A | 6/2010 |

* cited by examiner

*Primary Examiner* — Barbara Reinier
(74) *Attorney, Agent, or Firm* — Canon USA Inc. IP Division

(57) ABSTRACT

An information processing apparatus includes a control unit configured to add a first live tile content including printer information about a first print queue and a second live tile content including printer information about a second print queue different from the first print queue to a tile list that is gathering for specifying a live tile content displayed by an operating system, wherein the first print queue and the second print queue are each associated with a same application. The operating system is configured to display the first live tile content in a tile display region according to the tile list and to display the second live tile content in the tile display region in place of the first live tile content after the first live tile content is displayed, and the application is launched when a user specifies the tile display region.

17 Claims, 15 Drawing Sheets

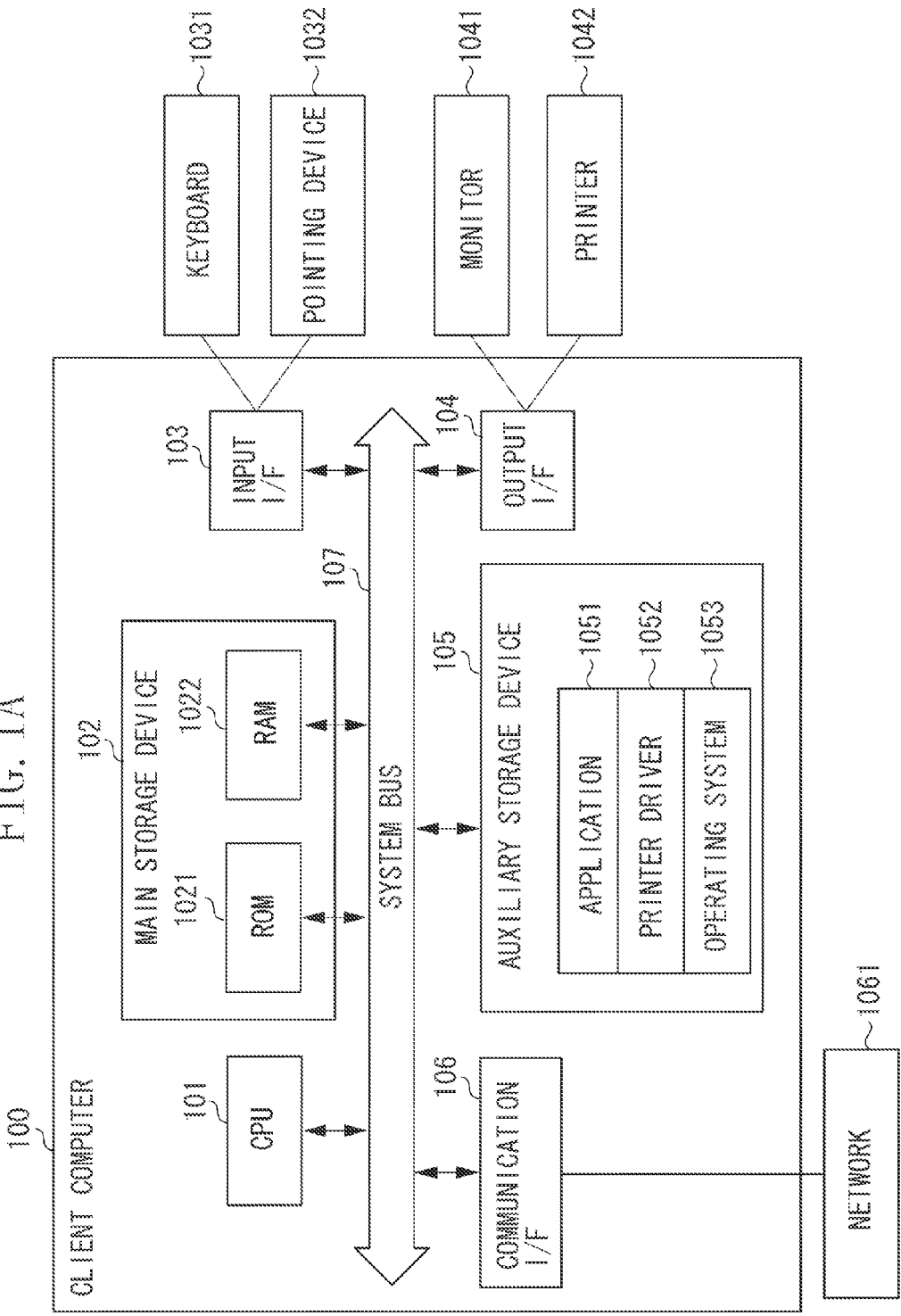

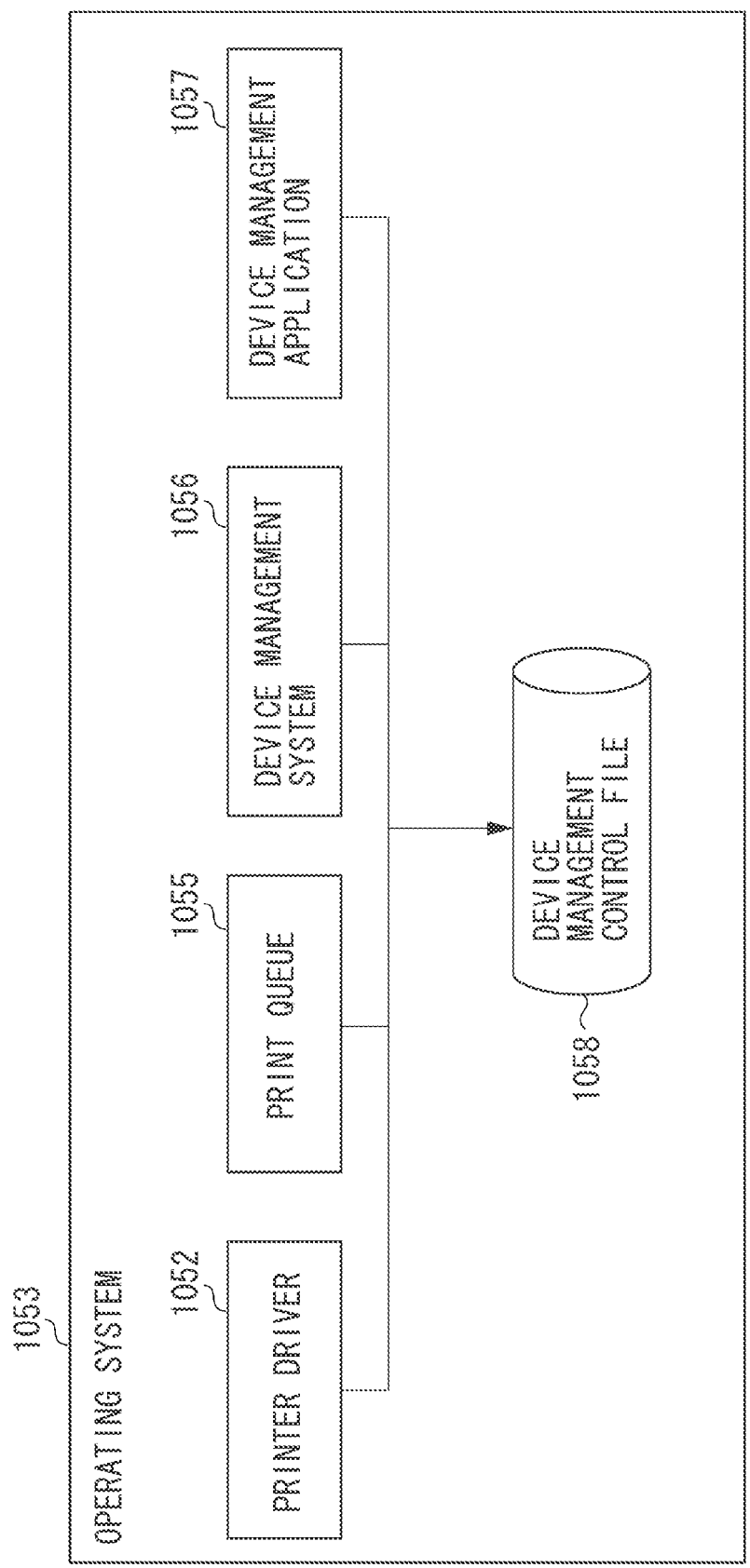

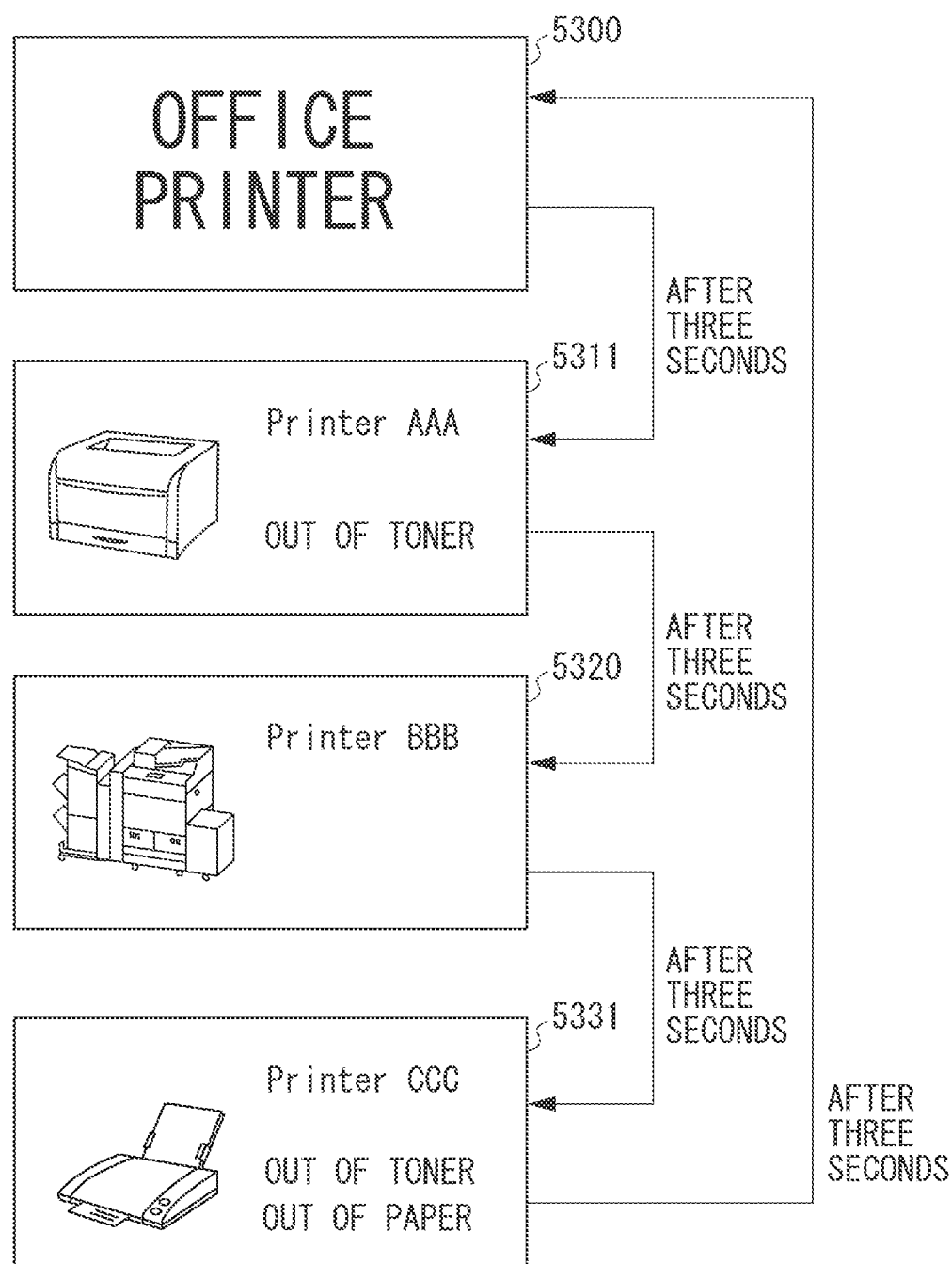

FIG. 10
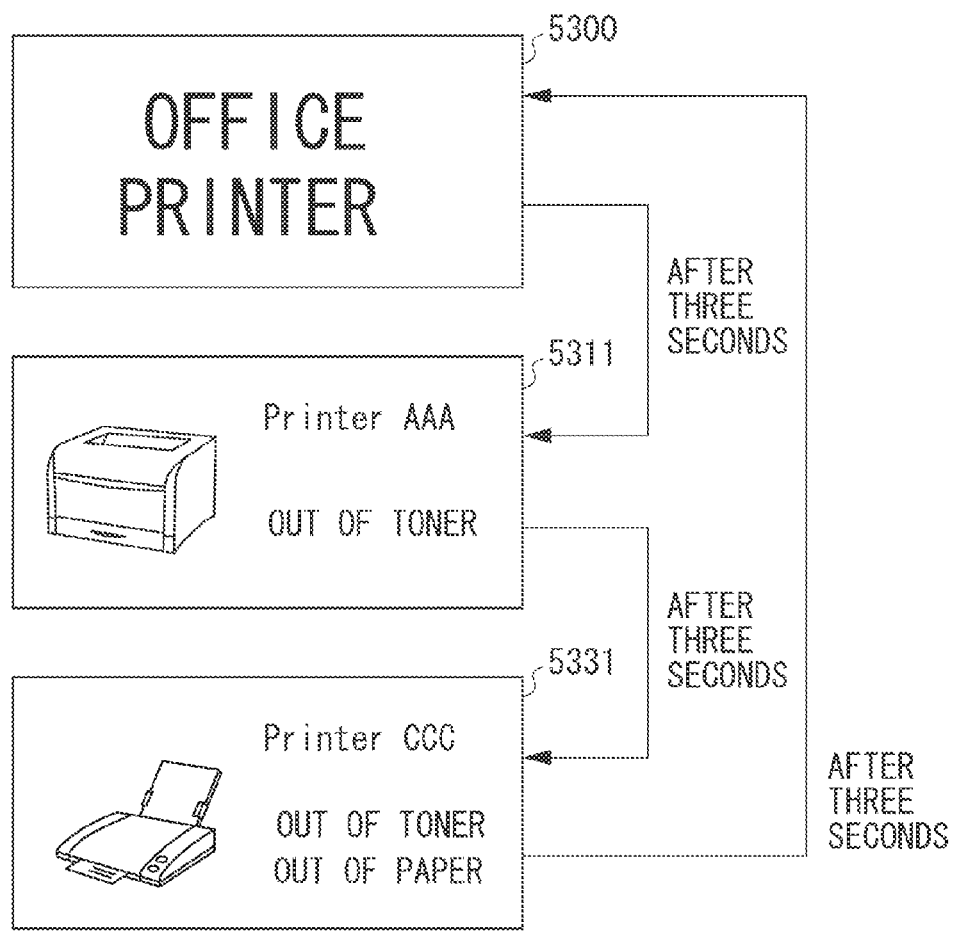
LIVE TILE CONTENT WITH PRINT QUEUE
HAVING NO PROBLEM IS NOT DISPLAYED
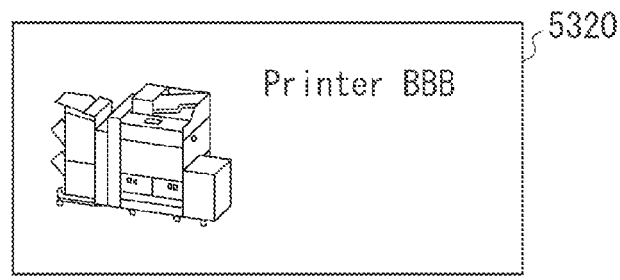

FIG. 11
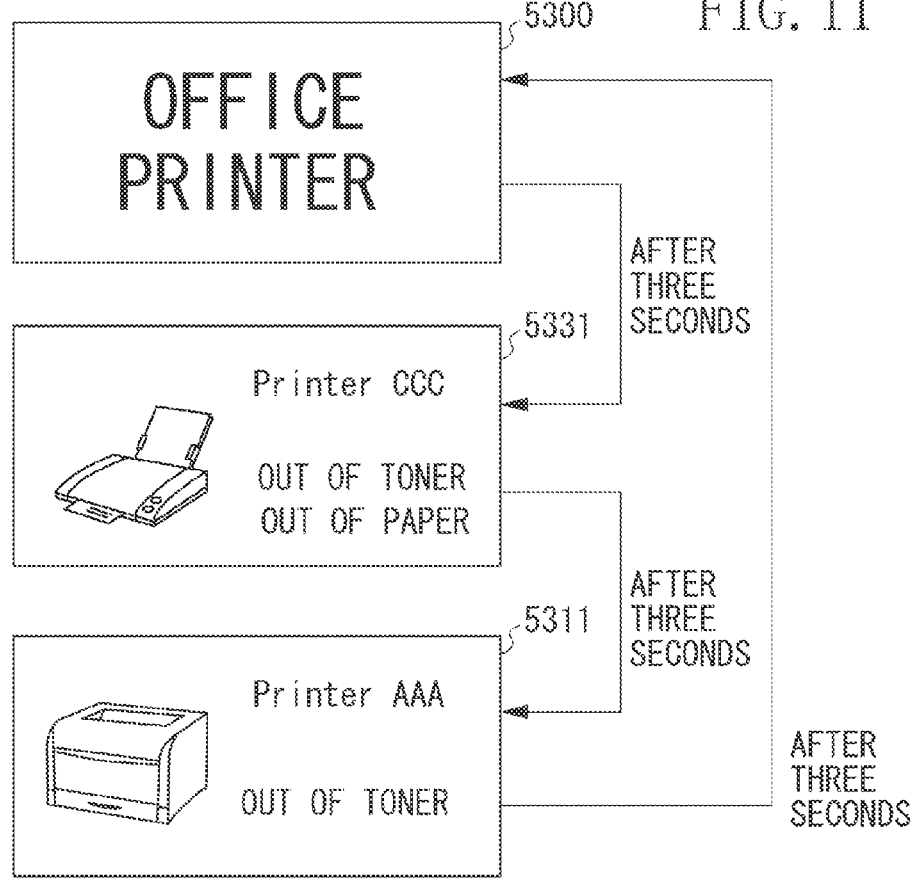
LIVE TILE CONTENT WITH PRINT
QUEUE OF LESS IMPORTANCE
IS NOT DISPLAYED
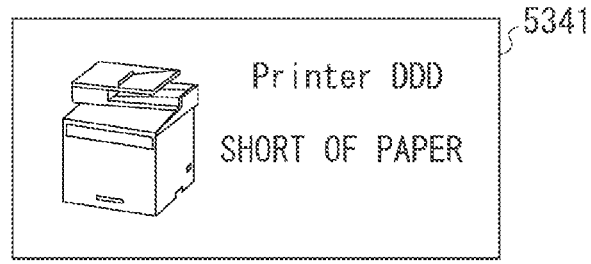
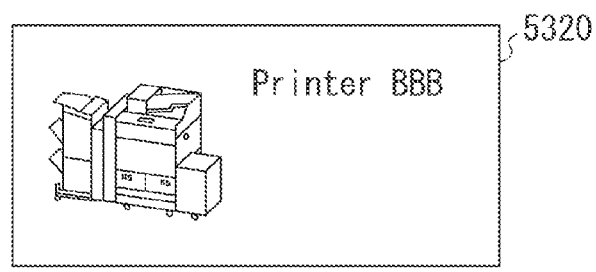

FIG. 12

STATUS POINT TABLE (1600)

| STATUS | STATUS POINT |
|---|---|
| SERVICE ERROR | 150 |
| OUT OF TONER | 100 |
| PAPER JAM | 60 |
| OUT OF PAPER | 50 |
| SHORT OF TONER | 40 |
| SHORT OF PAPER | 30 |
| NORMAL | 0 |

FIG. 13

PRINT QUEUE MANAGEMENT TABLE (1500)

| ID | TAG NAME | QUEUE NAME | TOTAL STATUS POINT | STATUS |
|----|----------|------------|--------------------|--------|
| 01 | 2 | Printer AAA | 100 | OUT OF TONER |
| 02 | 4 | Printer BBB | 0 | NORMAL |
| 03 | 1 | Printer CCC | 150 | OUT OF TONER / OUT OF PAPER |
| 04 | 3 | Printer DDD | 30 | SHORT OF PAPER |

INFORMATION PROCESSING APPARATUS, CONTROL METHOD THEREOF, AND COMPUTER-READABLE RECORDING MEDIUM FOR DISPLAYING LIVE TILE CONTENTS WHILE PERFORMING SWITCHING THEREOF

BACKGROUND OF THE INVENTION

1. Field of the Invention

The present disclosure relates to a technique for displaying a plurality of live tile contents while performing switching thereof.

2. Description of the Related Art

Japanese Patent Application Laid-Open No. 2010-123103 discusses a method for associating a device management system with a device driver by describing a plurality of driver names in an extensible markup language (XML).

SUMMARY OF THE INVENTION

According to an aspect of the present disclosure, an information processing apparatus includes a control unit configured to add a first live tile content including printer information about a first print queue and a second live tile content including printer information about a second print queue different from the first print queue to a tile list that is gathering for specifying a live tile content displayed by an operating system, wherein the first print queue and the second print queue are each associated with a same application, wherein the operating system is configured to display the first live tile content in a tile display region according to the tile list and to display the second live tile content in the tile display region in place of the first live tile content after the first live tile content is displayed, and wherein the application is launched when a user specifies the tile display region.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

FIG. 1A illustrates a system configuration according to an exemplary embodiment of the present disclosure. FIG. 1B illustrates a software configuration according to the exemplary embodiment of the present disclosure.

FIG. 4 is a schematic diagram illustrating external appearances of tiles according to a first exemplary embodiment of the present disclosure.

FIG. 10 is a schematic diagram illustrating external appearances of tiles according to a third exemplary embodiment of the present disclosure.

FIG. 11 is a schematic diagram illustrating external appearances of tiles according to a fourth exemplary embodiment of the present disclosure.

FIG. 12 illustrates a status point table.

FIG. 13 illustrates a print queue management table.

DESCRIPTION OF THE EMBODIMENTS

Figure 2:
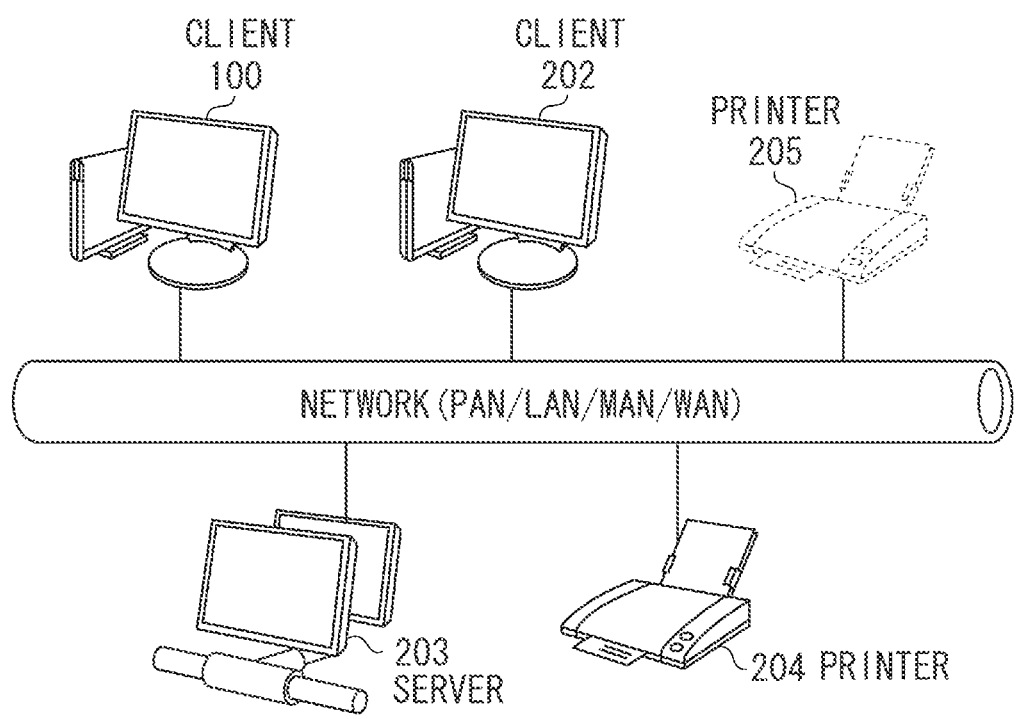
FIG. 2 illustrates a network environment.

Various exemplary embodiments, features, and aspects of the disclosure will be described in detail below with reference to the drawings.

It is assumed that, by applying a technique discussed in Japanese Patent application Laid-Open No. 2010-123103, device drivers (or print queues) associated with applications are displayed in one display region. When such a configuration is adopted, for example, if a display region is small, information about all peripheral devices associated with the applications may not be able to be displayed. Even if the information about the all peripheral devices can be displayed in the one display region, as long as the display region is limited, when the peripheral devices associated with the applications are increased, information about an added peripheral device may not be displayed in the display region.

A system for solving such a problem will be described below.

FIGS. 1A and 1B illustrate a block configuration diagram of a system using a general computer according to an exemplary embodiment of the present disclosure. Unless otherwise noted, as long as a function of the present disclosure is performed, the present disclosure can be adopted to a stand-alone function, a system including a plurality of devices, or a system connected via a network to perform processing.

A client computer 100 includes the system illustrated in FIG. 1A. Details will be described below.

A central processing unit (CPU) 101 controls an entire apparatuses according to a program stored in a read only memory (ROM) 1021 or random access memory (RAM) 1022 in a main storage apparatus 102, or an auxiliary storage device 105. The RAM 1022 is used as a work area when the CPU 101 executes various types of processing. The auxiliary storage device 105 records an OS 1053 and an application 1051.

Input devices such as a keyboard 1031 and a pointing device 1032 including a mouse and a touch panel are used to give various types of instructions from a user to the computer connected via an input interface (I/F) 103.

An output I/F 104 is used to output data to outside the client computer 100, in other words, the output I/F 104 outputs the data to an output device such as a monitor 1041 and a printer 1042. The printer 1042 may not be directly connected with a local input/output (I/O). In other words, the printer 1042 may be connected to a network 1061 via a communication I/F 106.

Further, a common data system bus 107 is used to transmit/receive the data between the I/Fs and the modules Additionally, the CPU 101 executes the processing based on the program stored in the auxiliary storage device 105 to realize a software configuration of the client computer 100 illustrated in FIG. 1B and each step of the flowcharts described below.

As illustrated in FIG. 1B, a printer driver 1052 and a print queue 1055 retain a device identification (ID) corresponding to a connected printer. Further, a device management control file 1058 describes how the device ID is associated with a device management system 1056 and a device management application 1057. With reference to the device management control file 1058, the OS 1053 can determine how the printer driver 1052, the print queue 1055, the device management system 1056, and the device management application 1057 are associated with one another.

Further, when a print queue associated with the device management application 1057 is generated, the OS 1053 installs the device management application 1057.

However, the device management system cannot manage the print queue corresponding to each function of a plurality of peripheral devices to which internet protocol (IP) addresses, which are different among the peripheral devices, are allocated. The device management system manages either a single print queue corresponding to the peripheral device or a plurality of print queues each corresponding to a plurality of peripheral devices to which a same IP address is allocated.

On the other hand, the device management application can manage the print queue corresponding to the each function of the plurality of peripheral devices to which the IP addresses, which are different among the peripheral devices, are allocated.

Furthermore, when the OS 1053 retains a media access control (MAC) address of the peripheral device, the device management system cannot manage the print queue corresponding to each function of the plurality of peripheral devices to which the MAC addresses, which are different among the peripheral devices, are allocated. On the other hand, the device management application can manage the print queue corresponding to the each function of the plurality of peripheral devices to which the MAC addresses, which are different among the peripheral devices, are allocated.

The IP address and the MAC address are collectively referred to as an address.

According to the specification, the printer will be described as an example of the peripheral device corresponding to the print queue, however, the peripheral device may also be a facsimile (FAX). Similarly, printer information described below may be information about the FAX.

The device management control file may be generated for each device, or one device management control file may be generated for all types of devices.

FIG. 2 briefly illustrates an environment of the network 1061 according to the exemplary embodiment of the present disclosure. Client computers 100 and 202 for generating a document and an image to be printed are connected to a single network or a plurality of networks. Further, a server 203 for managing a client user or the printer may be connected to the network(s). Printers 204 and 205 are connected to the single network or the plurality of networks. However, the printer 205 may be in an off-line state where it cannot be actually used, even though the printer is physically connected to the networks. The networks include various types of network ranging from small scale networks such as a personal area network (PAN), a local area network (LAN), and a wide area network (WAN), to large scale networks. All of the devices described above are connected to all networks.

Figure 3A:
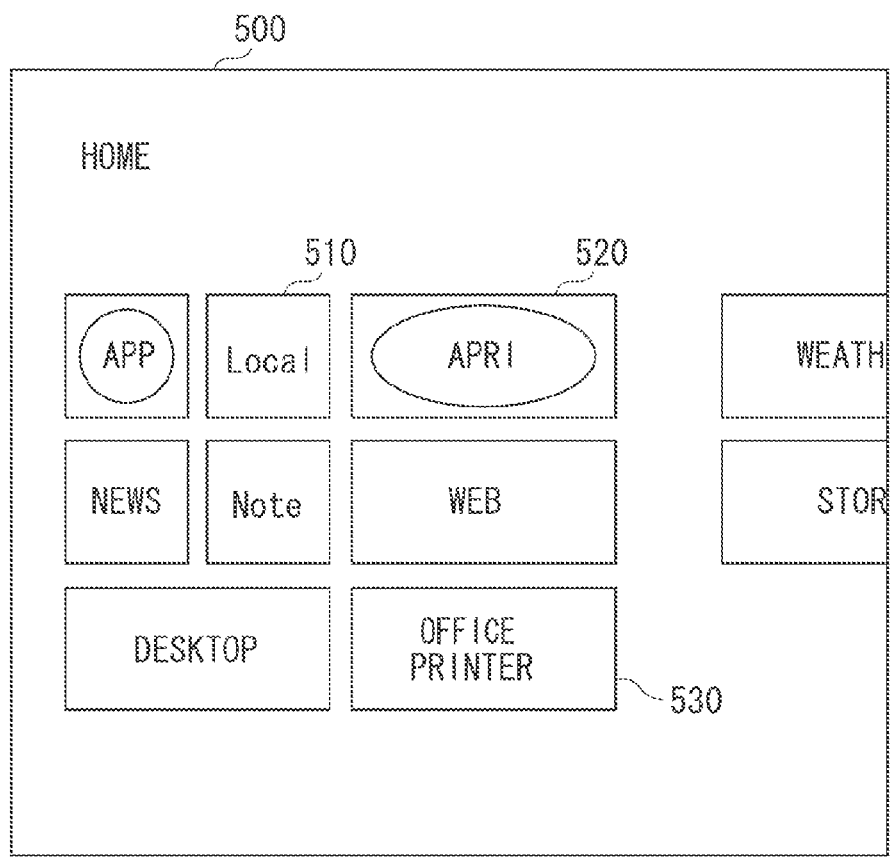
FIGS. 3A and 3B illustrate display examples of device management applications.
Figure 3B:
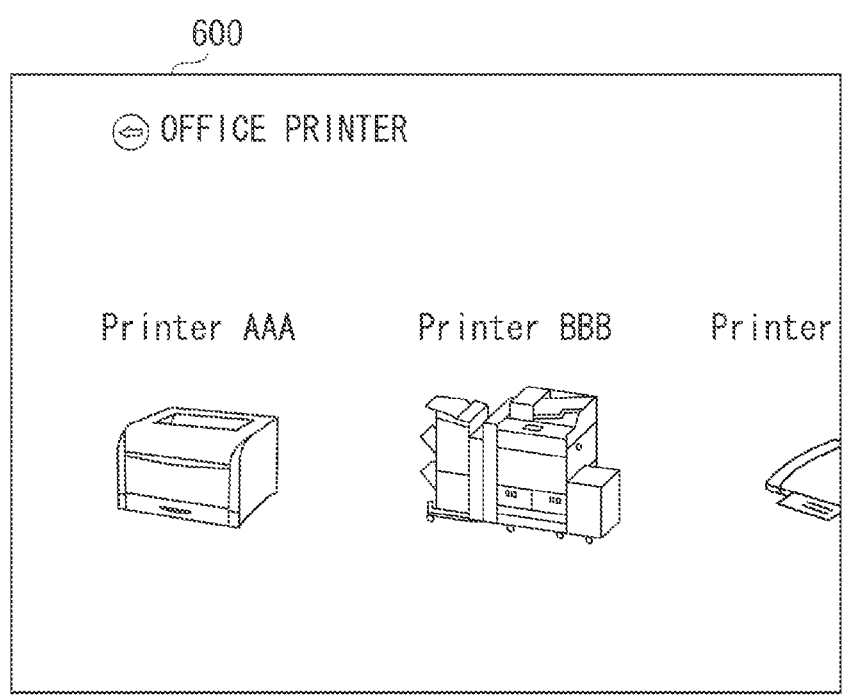

FIGS. 3A and 3B are display examples of the device management application 1057.

As illustrated in FIG. 3A, the OS 1053 displays functions 510 and 520 aligned in a tile-like arrangement. The OS 1053 displays a tile 530 for the device management application 1057 as one of the tiles in a tile-like shape. According to the specification, for convenience, a screen illustrated in FIG. 3A is referred to as a home screen. The home screen displays information provided by various applications installed in the OS 1053. Also, the home screen is provided by the OS 1053 to launch the application in response to a user's click operation.

Further, when the tile 530 is clicked, a screen 600 indicating a state of the plurality of peripheral devices managed by the device management application 1057 (associated with the device management application 1057) is displayed as illustrated in FIG. 3B. In the device management application 1057, via the screen for indicating the information about the plurality of peripheral devices, the user can confirm a current state of the displayed device and consumable goods.

FIG. 4 is a schematic diagram illustrating external appearances of the tile 530 made by the OS 1053 and the device management application 1057 on the home screen according to a first exemplary embodiment of the present disclosure. FIG. 4 illustrates a changing state where, right after the home screen is displayed, a tile 5300 for the tile 530 is displayed, after three seconds, a tile 5311 is displayed, and further after three seconds, a tile 5320 is displayed. The tiles 5300, 5311, and 5320 are each referred to as a live tile content. The live tile content is an image generated by the device management application 1057 and display thereof is updated by the OS 1053.

The specification describes examples in which the live tile content is generated in steps of the flowcharts described below. However, the device management application 1057 may hold an image including predetermined printer information as the live tile content.

According to the example illustrated in FIG. 4, after the contents 5300 to 5331 are sequentially displayed, the loop display is performed by returning to the content 5300 again. Further, according to the example illustrated in FIG. 4, the live tile contents 5311, 5320, and 5331 display the printer information about the print queues of Printer AAA, Printer BBB, and Printer CCC, respectively.

The printer information refers to an icon, a queue name, and status information such as errors of the peripheral device including the printer and the FAX. More specifically, with reference to FIG. 4, the live tile contents 5311, 5320, and 5311 display the icon and the queue name of the peripheral device corresponding to each print queue. Additionally, the live tile content 5311 indicates that the Printer AAA is out of toner as the status information included in the printer information. Further, the live tile content 5331 indicates that the Printer CCC is out of toner and out of paper as the status information included in the printer information. Furthermore, since the Printer BBB keeps a normal status, the live tile content 5320 indicates nothing at a position corresponding to a position where the status is displayed in the live tile content 5311 and the live tile content 5331.

All of the icon, the queue name, and the status information do not need to be displayed in the live tile content as the printer information. One kind of the printer information described above may be displayed.

In the specification, a list (gathering) of the live tile contents is referred to a tile list. The tile list is managed by the OS 1053. By performing loop display according to the tile list, the user can recognize that the device management application 1057 is associated with each of the Printer AAA, the Printer BBB, and the Printer CCC. At the same time, the printer information about each printer is displayed and thus the information about the printer having a problem can be displayed, so that the user can easily recognize the printer state.

Figure 5:
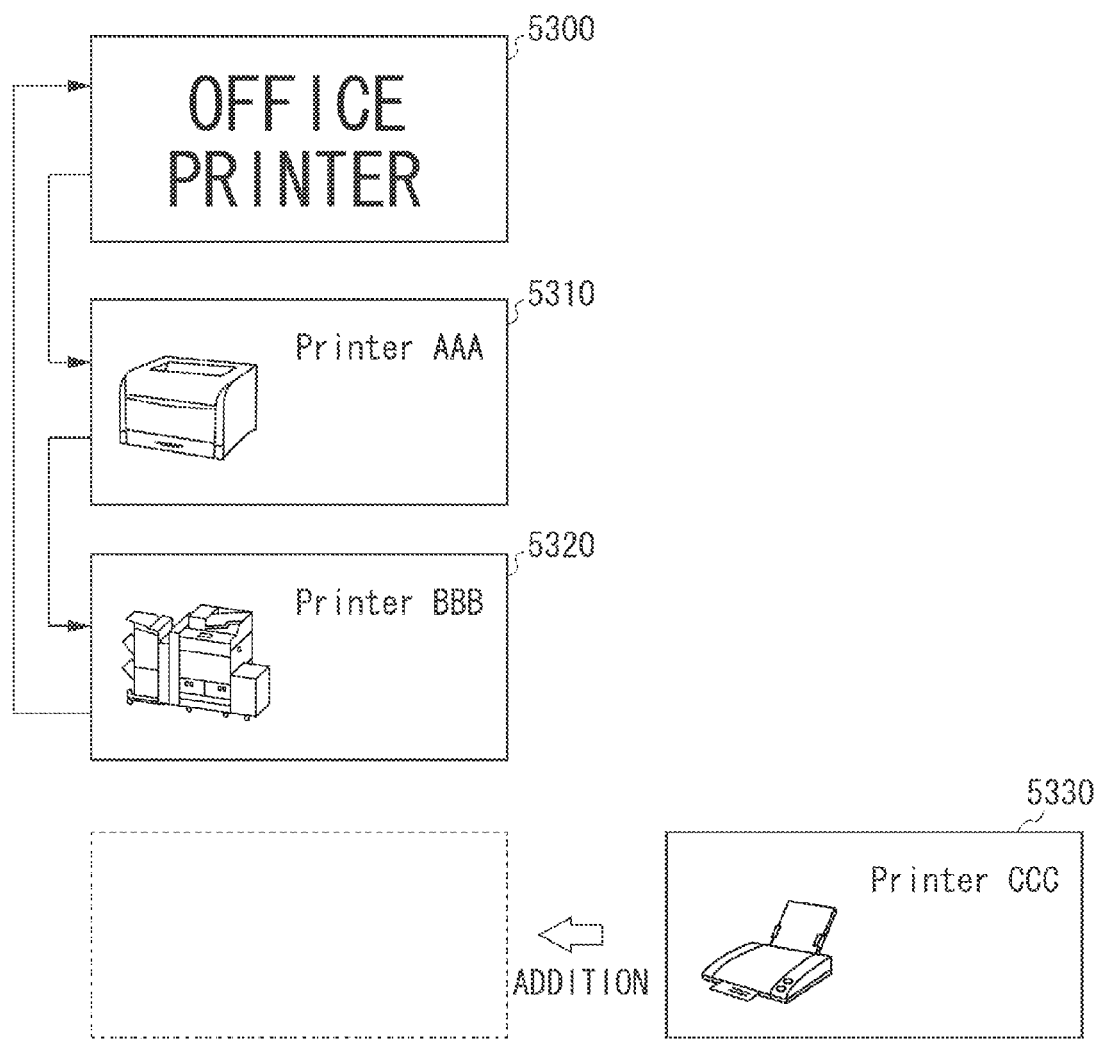
FIG. 5 illustrates processing performed when a new printer is connected.
Figure 6:
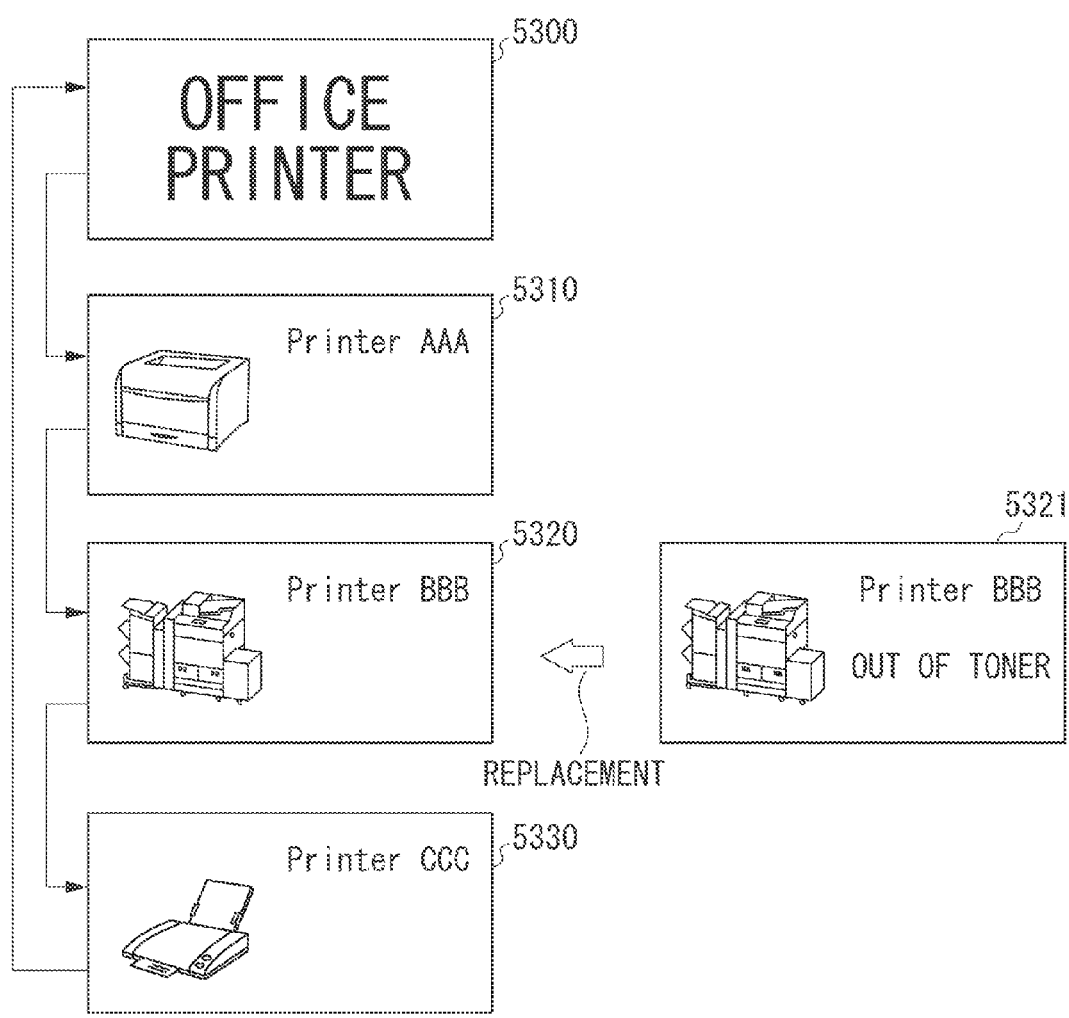
FIG. 6 illustrates processing performed when a status of a printer is changed.

With reference to FIGS. 5 and 6, processing in which the device management application 1057 generates the live tile content will be briefly described.

FIG. 5 illustrates an operation performed when the new Printer CCC is connected to the client computer 100. More specifically, when the Printer AAA and the Printer BBB have been already connected to the client computer 100 and the live tile contents of both printers have been already generated, the operation for further connecting the Printer CCC is illustrated. The device management application 1057 has already registered the live tile contents 5300, 5310, and 5320 as the tile list. When detecting new connection, the device management application 1057 generates a new live tile content 5330 indicating the Printer CCC, and then adds the live tile content 5330 to the tile list as illustrated in FIG. 5. With this arrangement, the user can confirm which printer is associated with the device management application 1057 via the home screen.

On the other hand, FIG. 6 illustrates processing performed when the status of the Printer BBB is changed from "normal" to "out of toner". At this point, the device management application 1057 generates a new live tile content 5321 indicating that the Printer BBB is out of toner. Subsequently, as illustrated in FIG. 6, the live tile content 5320 indicating that the Printer BBB is in a normal status is replaced with the live tile content 5321. Since the live tile content 5320 is replaced with the live tile content 5321, the OS 1053, instead of performing the loop display of the live tile contents 5300, 5310, 5320, and 5330, performs the loop display of the live tile contents 5300, 5310, 5321, and 5330. With this display, the user can find the printer having a problematic status, of the printers associated with the device management application 1057, only by browsing the home screen.

Figure 7:
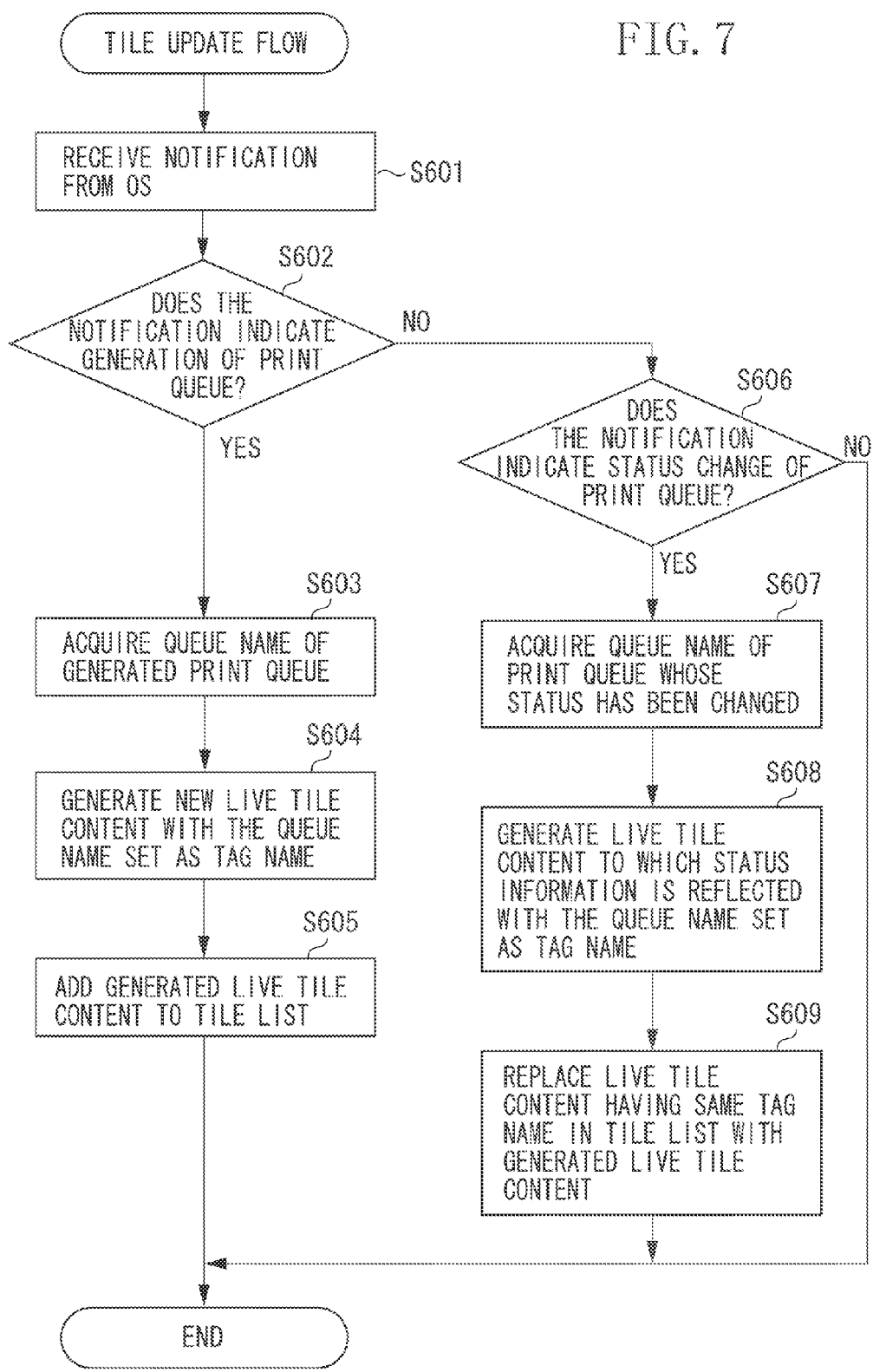
FIG. 7 is a flowchart illustrating processing performed by a device management application.

FIG. 7 is a flowchart illustrating the processing described with reference to FIGS. 5 and 6.

Figure 14:
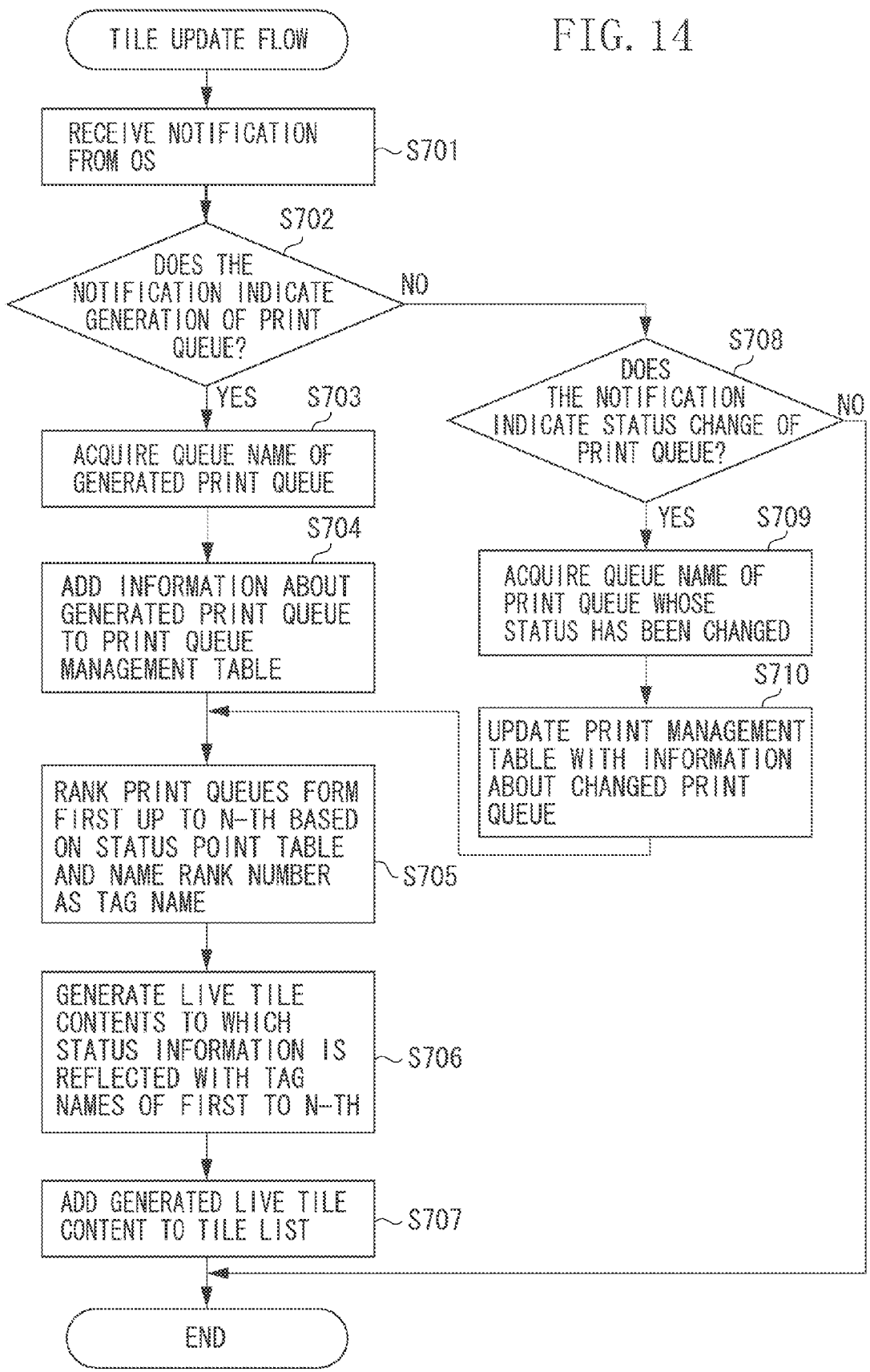
FIG. 14 is a flowchart illustrating processing performed by a device management application.

Each step illustrated in FIGS. 7 and 14 are performed by the device management application 1057.

In step S601, the device management application 1057 receives a "notification" from the OS 1053. When a printer is connected to the client computer 100 and a print queue is generated, the OS 1053 performs the "notification" to the device management application 1057 associated with the printer. Association is performed with reference to the device management control file 1058. Similarly, the OS 1053 performs the "notification" to the device management application 1057 also when receiving information about a status change from the connected printer.

In step S602, the device management application 1057 confirms whether the notification indicates generation of the print queue. When the notification indicates the generation of the print queue (YES in step S602), then in step S603, the queue name, which is the name of the generated print queue, is acquired from the OS 1053. In step S604, a new live tile content 5330 is generated with the acquired queue name set as a tag name. More specifically, an empty live tile content is generated and then the icon, the queue name, and the status information about the corresponding printer are arranged on the tile. The icon of the printer retained by the device management application 1057 is used. Further, the status information is acquired from the peripheral device corresponding to the print queue.

In step S605, the generated live tile content 5330 is added to the tile list, and then the processing ends. The device management application 1057 uses an application programming interface (API) prepared by the OS 1053 to add the live tile content 5330 to the tile list.

On the other hand, in step S606, when the notification from the OS 1053 does not indicate the generation of the print queue (NO in step S602), then in step S606, the device management application 1057 confirms whether the notification indicates the status change of the print queue. When the notification indicates the status change of the print queue (YES in step S606), then in step S607, the queue name of the print queue whose status has been changed is acquired from the OS 1053. In step S608, the live tile content 5321 is generated to which the status change is reflected with the acquired queue name set as a tag name. In step S609, the device management application 1057 replaces the live tile content 5320 having the same tag name in the tile list with the generated live tile content 5321. With such arrangement, when the new printer is connected to the client computer and thus the print queue is added, or when the status of the printer that has been already connected to the client computer is changed, the live tile content can be correctly updated.

The live tile contents retain their own "tag names". The OS 1053 performs processing described below when the live tile content having the same tag name as that of the live tile content included in the tile list is added to the tile list. The processing is performed for replacing the live tile content having the same tag name that has been already included in the tile list with the new live tile content. Thus, in step S609, the device management application 1057 may only request the OS 1053 to add the live tile content 5321 to the tile list. Further, according to the present exemplary embodiment, both the processing for generating the print queue and the processing for changing the status are performed in one flowchart. However, only one of the two processing operations may be performed.

Figure 8:
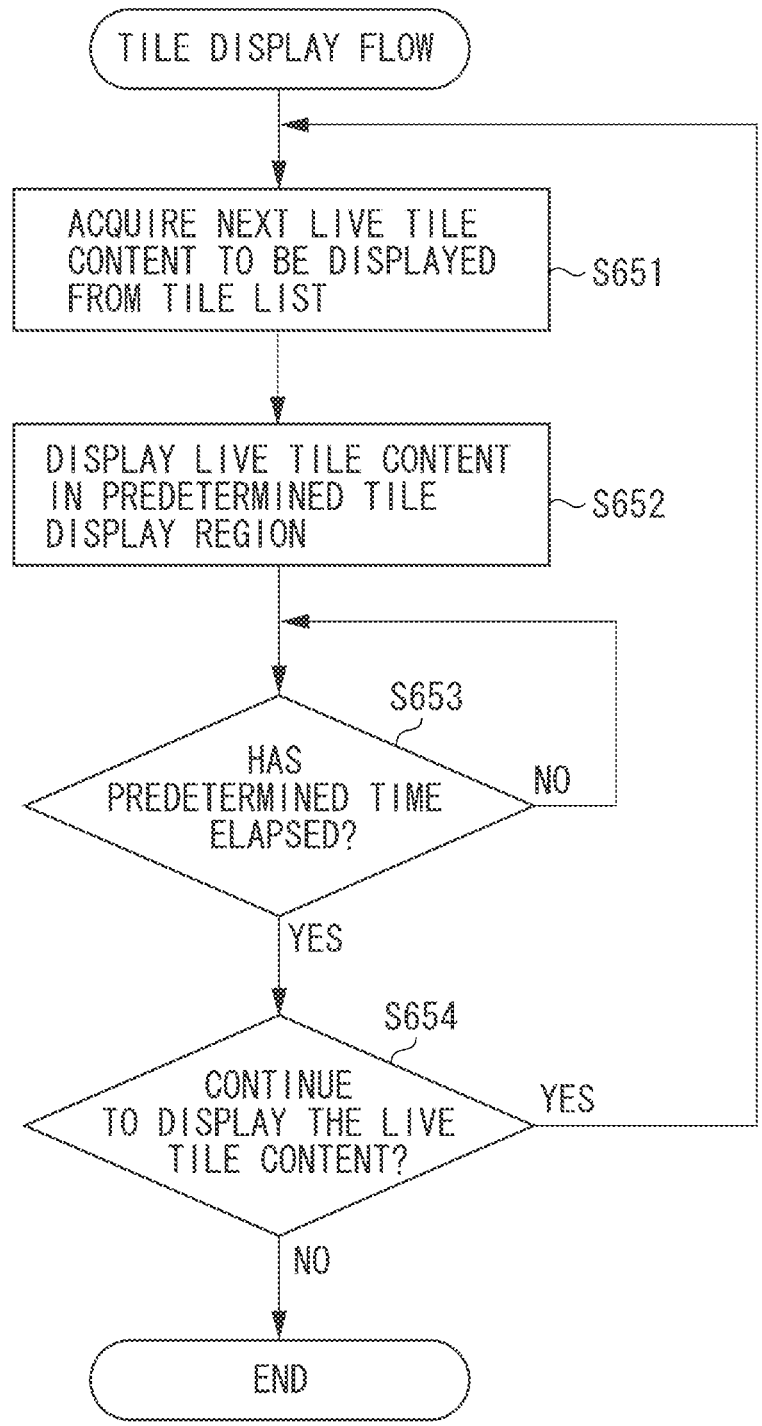
FIG. 8 is a flowchart illustrating processing in which an operating system (OS) performs loop display of live tile contents.

FIG. 8 is a flowchart illustrating the processing in FIG. 4 in which the OS 1053 performs the loop display of the live tile contents registered to the tile list on the home screen. In step S651, the OS 1053 acquires the live tile content to be displayed next from the tile list. In step S652, the acquired live tile content is displayed in a predetermined tile display region. The predetermined tile display region refers to a region of the tile 530 on the home screen illustrated in FIG. 3A. In step S653, the OS 1053 confirms whether a predetermined time (three seconds according to the example illustrated in FIG. 4) has elapsed. When the OS 1053 determines that the predetermined time has elapsed (YES in step S653) and then in step 654, the OS 1053 further determines that the display needs to be continued (YES in step S654), then the processing returns to step S651. When the OS 1053 determines that the predetermined time has not elapsed (NO in step S653), then the OS 1053 waits until the predetermined time elapses. When the OS 1053 determines that the display is not to be continued (NO in step S654), in other words, when the user sets the loop display of the live tile contents to be stopped, the processing ends. With the arrangement described above, the OS 1053 can sequentially display the live tile contents registered to the tile list in the same region.

The device management application 1057 and the OS 1053 perform the above operations so that the user can confirm the status of the printer associated with the device management application 1057 on the home screen without clicking the device management application 1057.

Figure 9:
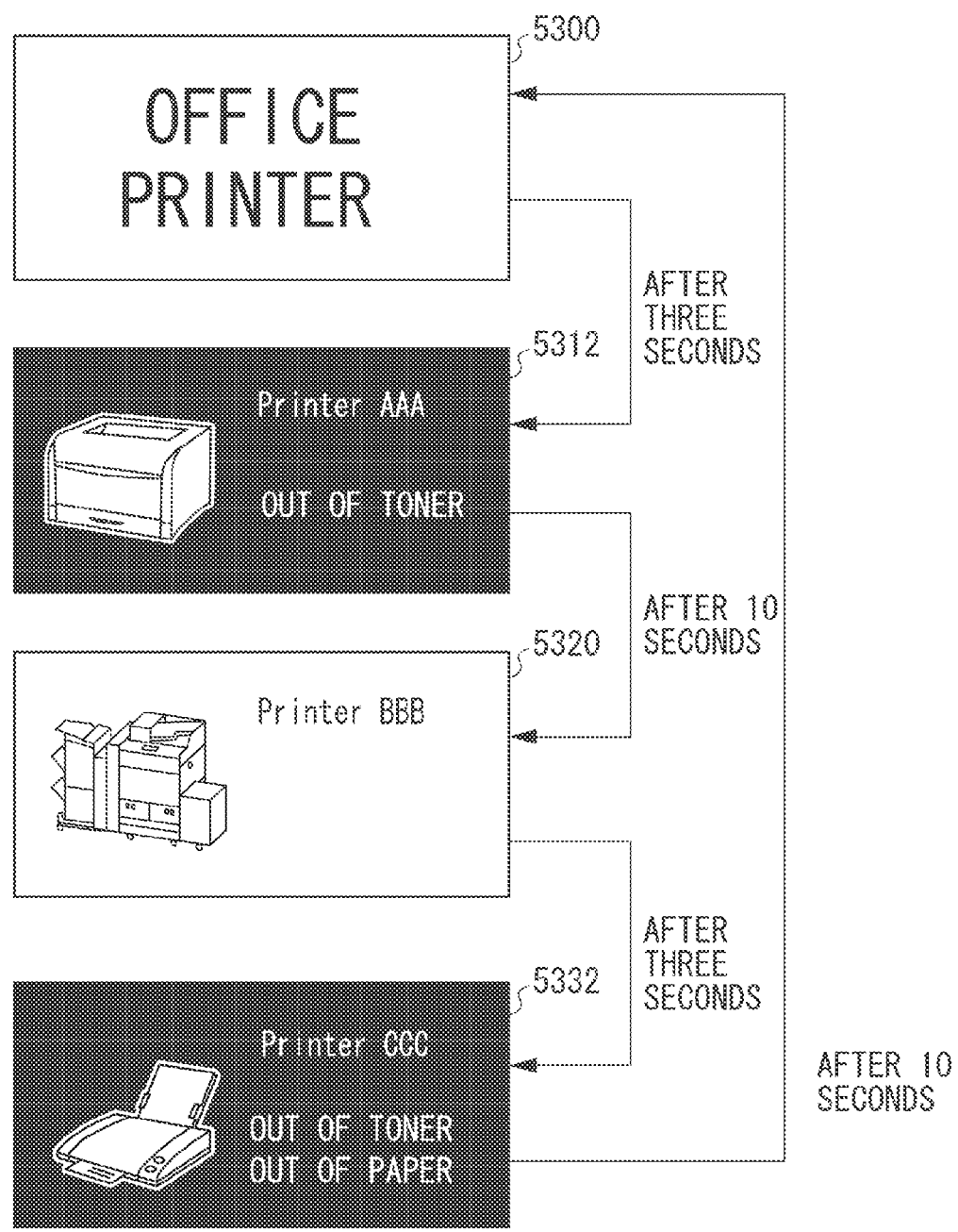
FIG. 9 is a schematic diagram illustrating external appearances of tiles according to a second exemplary embodiment of the present disclosure.

FIG. 9 is a schematic diagram illustrating the external appearances of the tile 530 made by the OS 1053 and the device management application 1057 on the home screen according to a second exemplary embodiment of the present disclosure. According to the first exemplary embodiment, in step S653, the OS 1053 displays the next live tile content when the predetermined time has elapsed. According to the present exemplary embodiment, as illustrated in FIG. 9, a case for changing a display time for each live tile content will be described. FIG. 9 illustrates an operation performed when the device management application 1057 specifies the number of seconds of display to the tile list.

By specifying the number of seconds of display to the tile list, the device management application 1057 indirectly notifies the OS 1053 of the number of seconds of display.

The device management application 1057 may use the API to notify the OS 1053 of the specified number of seconds of display.

In other words, to the tile list, the device management application 1057 specifies movement to the next live tile content when a predetermined time elapses after each live tile content is displayed. The device management application 1057 specifies the number of seconds of display at timing for adding the live tile content to the tile list in step S605 or timing for the replacement in step S609. The predetermined time herein is three seconds for the live tile contents 5300 and 5320, and ten seconds for the live tile content 5312 and 5332. The processing proceeds to step S654 when the specified number of seconds elapses in step S653, and thus the OS 1053 can perform an operation illustrated in FIG. 9.

Further, as illustrated in FIG. 9, the live tile contents of the Printer AAA in a status of being out of toner and the Printer CCC in a status of being out of toner and paper are highlighted. The device management application 1057 generates the highlighted live tile contents in step S604 or in step S608 to realize the highlighted display. More specifically, the emphatic display is realized by differentiating background of the live tile contents of the Printer AAA and the Printer CCC (black background according to the present exemplary embodiment) from the background of the Printer BBB. In other words, the highlighted display is realized by using the image including the background of the live tile content of the print queue having the problematic status (the errors), which is different from the background of the live tile content of another print queue having the normal status.

As described above, the live tile content of the problematic print queue is generated to be more noticeable than the live tile content of the normal print queue, so that the user can easily recognize the problems.

Other configurations are not repeatedly described since they are similar to the first exemplary embodiment.

FIG. 10 is a schematic diagram illustrating the external appearances of the tile 530 made by the OS 1053 and the device management application 1057 on the home screen according to a third exemplary embodiment of the present disclosure. The second exemplary embodiment illustrates the example of highlighting the live tile content of the problematic print queue. The third exemplary embodiment illustrates an example of performing the loop display of the live tile contents with the problematic print queues only. Upon the reception of the "notification" from the OS 1053, the device management application 1057 always registers only live tile contents with the problematic print queues to the tile list, so that an operation as illustrated in FIG. 10 can be performed.

With this arrangement, of the print queues associated with the device management application 1057, only the problematic print queues are displayed as the tiles on the home screen, and thus the user can easily recognize the problematic print queues even when a great number of print queues are associated with the device management application 1057. Processing performed by the OS 1053 according to the present exemplary embodiment may be similar to that according to the first exemplary embodiment. Other configurations are not repeatedly described since they are similar to the first exemplary embodiment.

To easily grasp the peripheral device that can be used by the user, of the print queues associated with the device management application 1057, only the live tile contents having the normal status may be displayed.

FIG. 11 is a schematic diagram illustrating the external appearances of the tile 530 made by the OS 1053 and the device management application 1057 on the home screen according to a fourth exemplary embodiment of the present disclosure. In the third exemplary embodiment, all the live tile contents with the problematic print queues are displayed. In the present exemplary embodiment, of the problematic print queues, live tile contents up to "N" are only displayed. As illustrated in FIG. 11, the "N" is defined as "3", and the live tile contents with print queues having high-important statuses are sequentially displayed in order.

There will be described effects of sequentially displaying the live tile contents with print queues having high-important statuses in order. When the live tile contents in the tile list are sequentially displayed according to a display order, the live tile content with print queues having high-important statuses are displayed earlier than other live tile contents. If the display order of the live tile content in the tile list is determined with the importance of the status of the print queue ignored, and when the live tile contents are sequentially displayed on the home screen according to a descending order of the tile list, the problems described below will arise. If the live tile content listed upper in the tile list is displayed prior to the print queue having the more important status, the print queue having the more important status takes time to be displayed on the home screen. If the live tile contents with print queues having high-important statuses are displayed in order, this problem can be avoided.

More specifically, the Printer CCC 5331 indicates the status of being out of toner and paper, which is the most important status, and the Printer AAA 5311 indicates is the status of being out of toner, which is secondary important, and thus the Printer AAA 5311 is displayed next to the Printer CCC 5331. The Printer BBB indicating a less-important status and the Printer DDD indicating a normal status are not displayed.

The importance for each status is specified by a status point table 1600 managed by the device management application 1057. FIG. 12 illustrates an example of the status point table 1600. The status point 1602 is previously determined for each status 1601. The higher status point indicates the more important status.

FIG. 13 illustrates a print queue management table 1500 managed by the device management application 1057. The device management application 1057 calculates points for all print queues associated with the device management application 1057 as indicated in the status point table 1600. Status points are added up for the print queue having a plurality of statuses. An ID 1501 is allocated to all print queues. A queue name 1503 indicates a name of each print queue, and a status 1505 indicates a status of the each print queue. A total status point 1504 is acquired by adding up the status points of the statuses indicated in the status 1505. Further, according to the present exemplary embodiment, the order of the total status point 1504 is set as a tag name 1502 as it is.

FIG. 14 is a flowchart illustrating an operation of the device management application 1057 according to the present exemplary embodiment. In step S701, the device management application 1057 receives the "notification" from the OS 1053. Subsequently, in step S702, the device management application 1057 confirms whether the notification indicates the generation of the print queue. When the notification indicates the generation of the print queue (YES in step S702), then in step S703, the queue name of the generated print queue is acquired from the OS 1053. In step S704, information about the generated print queue is added to the print queue management table 1500.

On the other hand, when the notification does not indicate the generation of the print queue (NO in step S702), then in step S708, the device management application 1057 confirms whether the notification indicates the status change of the print queue. When the notification indicates the status change of the print queue (YES in step S708), then in step S709, the queue name of the print queue whose status has been changed is acquired from the OS 1053. In step S710, the print queue management table 1500 is updated with the information about the changed print queue.

In step S705, the device management application 1057 calculates the total status point 1504 based on the status point table 1600 for the print queue that is added in step S704 or updated in step S710. The all print queues are ranked from the first up to the Nth, and the print queue management table 1500 is updated with the order number set as the tag name 1502.

In step S706, the device management application 1057 generates the live tile contents to which the status information is reflected with the tag names 1502 from the first to the Nth.

Finally, in step S707, the generated live tile content is added to the tile list. At this point, as described above, the live tile content in the tile list having the same name as that of the new live tile content is replaced with the new live tile content.

Thus, as illustrated in FIG. 11, the information only about the "N" print queues of high importance can be displayed as the tiles on the home screen. The processing performed by the OS 1053 according to the present exemplary embodiment is similar to that of the first exemplary embodiment.

An example of including information about a plurality of printers into one live tile content according to a fifth exemplary embodiment of the present disclosure will be described. For example, the information about two printers may be included in one live tile content. With such a configuration, when the live tile contents are displayed while performing switching thereof by a method described in the first to fourth exemplary embodiments, the information about the two printers in the one tile content may be switched, or only the information about one of the two printers may be switched.

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a CPU, micro processing unit (MPU), or other circuitry, and may include a network of separate computers or separate computer processors. The computer executable instructions may be provided to the computer, for example, from a network or the storage medium. The storage medium may include, for example, one or more of a hard disk, a RAM, a ROM, a storage of distributed computing systems, an optical disk (such as a compact disc (CD), digital versatile disc (DVD), or Blu-ray Disc (BD)™), a flash memory device, a memory card, and the like.

According to the exemplary embodiments of the present disclosure, the printer information about the plurality of print queues can be displayed in the same display region.

While the present disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

This application claims priority from Japanese Patent Application No. 2012-110750 filed May 14, 2012, which is hereby incorporated by reference herein in its entirety.

What is claimed is:

1. An information processing apparatus comprising:
a control unit configured to add a first live tile content including printer information about a first print queue and a second live tile content including printer information about a second print queue different from the first print queue to a tile list that is gathering for specifying a live tile content displayed by an operating system,
wherein the first print queue and the second print queue are each associated with a same application,
wherein the operating system is configured to display the first live tile content in a tile display region, according to the tile list, and to display the second live tile content in the tile display region, according to the tile list, in place of the first live tile content by replacing the first live tile content after the first live tile content is displayed,
wherein display of print queues from the tile list is based on live tile contents of problematic print queues,
wherein the control unit is configured to, when it is determined that importance of a status of the printer information about the first print queue is higher than a status of the printer information about the second print queue, specify, to the operating system, a display order of the first live tile content prior to a display order of the second live tile content, and
wherein the operating system is configured to display the first live tile content in the tile display region after a home screen including the tile display region is displayed, and display the second live tile content in the tile display region in place of the first live tile content after the first live tile content is displayed.

2. The information processing apparatus according to claim 1, wherein the control unit is configured to generate the first live tile content based on the printer information about the first print queue and the second live tile content based on the printer information about the second print queue.

3. The information processing apparatus according to claim 1, wherein the control unit is configured to, after generating the first live tile content of a first status including the printer information about the first print queue and adding the first live tile content to the tile list, when receiving from the operating system a notification indicating that the status of the first print queue is changed to a second status different from the first status, generate a third live tile content of the second status including the printer information about the first print queue, and update the first live tile content with the third live tile content.

4. The information processing apparatus according to claim 1, wherein the control unit is configured to, when receiving from the operating system a notification indicating that the first print queue is generated, generate the first live tile content and add the first live tile content to the tile list.

5. The information processing apparatus according to claim 1, wherein the control unit is configured to, when a status of the printer information about the first print queue indicates an error and a status of the printer information about the second print queue indicates normal, specify, to the operating system, a longer first display time for the first live tile content than a second display time for the second live tile content, and wherein the operating system is configured to display the first live tile content in the tile display region, display the second live tile content in the tile display region after the first display time elapses, and display a live tile content next to the second live tile content after the second display time elapses.

6. The information processing apparatus according to claim 1, wherein the printer information includes one or more of a name of the print queue, an icon of a peripheral device corresponding to the print queue, and the status information about the print queue.

7. The information processing apparatus according to claim 1, wherein the control unit is configured to, when a status of the printer information about the first print queue indicates an error and a status of the printer information about the second print queue indicates normal, add the first live tile content to the tile list without adding the second live tile content to the tile list, and wherein the operating system is configured not to display the second live tile content in the tile display region.

8. The information processing apparatus according to claim 1, wherein the control unit is configured to, when a status of the printer information about the first print queue indicates an error and a status of the printer information about the second print queue indicates normal, add the second live tile content to the tile list without adding the first live tile content thereto, and wherein the operating system is configured not to display the first live tile content in the tile display region.

9. A control method comprising:

performing control to add a first live tile content including printer information about a first print queue and a second live tile content including printer information about a second print queue different from the first print queue to a tile list that is gathering for specifying a live tile content displayed by an operating system, wherein the first print queue and the second print queue are each associated with a same application, wherein the operating system is configured to display the first live tile content in a tile display region, according to the tile list, and to display the second live tile content in the tile display region, according to the tile list, in place of the first live tile content after the first live tile content is displayed, wherein display of print queues from the tile list is based on live tile contents of problematic print queues, and when it is determined that importance of a status of the printer information about the first print queue is higher than a status of the printer information about the second print queue, specifying, to the operating system, a display order of the first live tile content prior to a display order of the second live tile content, wherein the operating system is configured to display the first live tile content in the tile display region after a home screen including the tile display region is displayed, and display the second live tile content in the tile display region in place of the first live tile content after the first live tile content is displayed.

10. The control method according to claim 9, wherein the performing control generates the first live tile content based on the printer information about the first print queue and the second live tile content based on the printer information about the second print queue.

11. The information processing apparatus according to claim 9, wherein, after generating the first live tile content of a first status including the printer information about the first print queue and adding the first live tile content to the tile list, when receiving from the operating system a notification indicating that the status of the first print queue is changed to a second status different from the first status, the performing control generates a third live tile content of the second status including the printer information about the first print queue, and updating the first live tile content with the third live tile content.

12. The control method according to claim 9, when receiving from the operating system a notification indicating that the first print queue is generated, the performing control generates the first live tile content and adds the first live tile content to the tile list.

13. The control method according to claim 9, when a status of the printer information about the first print queue indicates an error and a status of the printer information about the second print queue indicates normal, the performing control specifies, to the operating system, a longer first display time for the first live tile content than a second display time for the second live tile content, wherein the operating system is configured to display the first live tile content in the tile display region, display the second live tile content in the tile display region after the first display time elapses, and display a live tile content next to the second live tile content after the second display time elapses.

14. The control method according to claim 9, wherein the printer information includes one or more of a name of the print queue, an icon of a peripheral device corresponding to the print queue, and the status information about the print queue.

15. The control method according to claim 9, wherein the operating system is configured not to display the second live tile content in the tile display region.

16. The control method according to claim 9, when a status of the printer information about the first print queue indicates an error and a status of the printer information about the second print queue indicates normal, the performing control adds the second live tile content to the tile list without adding the first live tile content thereto, wherein the operating system is configured not to display the first live tile content in the tile display region.

17. A non-transitory computer-readable recording medium storing a program that causes a computer to execute a method, the method comprising:

performing control to add a first live tile content including printer information about a first print queue and a second live tile content including printer information about a second print queue different from the first print queue to a tile list that is gathering for specifying a live tile content displayed by an operating system, wherein the first print queue and the second print queue are each associated with a same application, wherein the operating system is configured to display the first live tile content in a tile display region, according to the tile list, and to display the second live tile content in the tile display region, according to the tile list, in place of the first live tile content after the first live tile content is displayed, wherein display of print queues from the tile list is based on live tile contents of problematic print queues, and when it is determined that importance of a status of the printer information about the first print queue is higher than a status of the printer information about the second print queue, specifying, to the operating system, a display order of the first live tile content prior to a display order of the second live tile content, wherein the operating system is configured to display the first live tile content in the tile display region after a home screen including the tile display region is displayed, and display the second live tile content in the tile display region in place of the first live tile content after the first live tile content is displayed.

\* \* \* \* \*